United States Patent
Cattoor et al.

(10) Patent No.: US 12,208,681 B2
(45) Date of Patent: *Jan. 28, 2025

(54) POWER TAKE-OFF (PTO) ASSEMBLY WITH A DISCONNECT CLUTCH

(71) Applicant: Dana Belgium N.V., Flanders (BE)

(72) Inventors: Kurt Cattoor, Koolkerke (BE); Jan A. Bedert, Oostduinkerke (BE); Filip D. Schacht, Meulebeke (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,355

(22) Filed: Nov. 29, 2023

(65) Prior Publication Data
US 2024/0317052 A1  Sep. 26, 2024

Related U.S. Application Data

(63) Continuation of application No. 18/188,999, filed on Mar. 23, 2023, now Pat. No. 11,884,151.

(51) Int. Cl.
*B60K 25/06* (2006.01)
(52) U.S. Cl.
CPC .................................. *B60K 25/06* (2013.01)
(58) Field of Classification Search
CPC ..................................................... B60K 25/06
See application file for complete search history.

(56) References Cited

U.S. PATENT DOCUMENTS

| | | | |
|---|---|---|---|
| 5,117,702 A | 6/1992 | Rodeghiero et al. | |
| 5,201,174 A | 4/1993 | Barber et al. | |
| 5,203,616 A | 4/1993 | Johnson | |
| 9,108,498 B2 | 8/2015 | Schultz et al. | |
| 10,781,910 B2 | 9/2020 | Dalum et al. | |
| 11,655,863 B1 | 5/2023 | Versini et al. | |
| 11,884,151 B1 * | 1/2024 | Cattoor | B60K 25/06 |
| 2019/0009772 A1 | 1/2019 | Vasudeva et al. | |
| 2022/0389975 A1 | 12/2022 | Schacht et al. | |
| 2023/0070513 A1 | 3/2023 | Di Lisa et al. | |
| 2023/0256807 A1 | 8/2023 | Hannon et al. | |

* cited by examiner

*Primary Examiner* — Faye M Fleming
(74) *Attorney, Agent, or Firm* — McCoy Russell LLP

(57) ABSTRACT

Systems and methods for a power take-off (PTO) assembly. The PTO assembly, in one example, includes a bi-directional pump in fluidic communication with a fluid reservoir and a hydraulic system and a disconnect clutch configured to mechanically disengage and disconnect the bi-directional pump from a transmission when a prime mover is in operation, and mechanically engage and connect the bi-directional pump to the transmission when the prime mover is shut down. The PTO assembly further includes an electromechanical valve configured to trigger engagement and disengagement of the disconnect clutch.

20 Claims, 8 Drawing Sheets

POWER TAKE-OFF (PTO) ASSEMBLY WITH A DISCONNECT CLUTCH

CROSS REFERENCE TO RELATED APPLICATION

The present application is a continuation of U.S. Non-Provisional patent application Ser. No. 18/188,999, entitled "POWER TAKE-OFF (PTO) ASSEMBLY WITH A DISCONNECT CLUTCH", and filed on Mar. 23, 2023. The entire contents of the above-listed application are hereby incorporated by reference for all purposes.

TECHNICAL FIELD

The present disclosure relates to a ground driven power take-off (PTO) assembly with a disconnect clutch that is actuated using an electro-mechanical valve.

BACKGROUND AND SUMMARY

Powertrains and other systems utilize power take-offs (PTOs) to expand the powertrain's operational capabilities and provide mechanical or hydraulic power to devices such as implements, auxiliary systems, and the like. Certain PTOs are driven by engines or motors. For instance, live PTOs have made use of engine output shafts to deliver power to the PTO.

In prior transmissions, when a vehicle is towed, the supply of oil to the transmission may be cut off. When towing over long distances, the lack of transmission lubrication may cause component degradation, thereby decreasing the transmission's lifespan.

The inventors have recognized the aforementioned issues and developed a PTO assembly to at least partially overcome the issues. The PTO assembly includes, in one example, a bi-directional pump in fluidic communication with a fluid reservoir and a hydraulic system. The PTO assembly further includes a disconnect clutch configured to mechanically disengage and disconnect the bi-directional pump from a system (e.g., a transmission) when a prime mover is in operation. The disconnect clutch is further configured to mechanically engage and connect the bi-directional pump to the system when the prime mover is shut down. Still further in such an example, the PTO assembly includes an electro-mechanical valve that is configured to trigger engagement and disengagement of the disconnect clutch. In this way, the bi-directional pump is able to provide hydraulic fluid (e.g., oil) to the transmission or other suitable system during prime mover shutdown and the transmission receives rotational input, such as during towing operation as well as while the prime mover is non-operational and the vehicle is coasting. Consequently, during towing and other operating conditions, the chance of transmission component degradation is reduced, thereby increasing transmission longevity. Further, the use of the bi-directional pump in the PTO assembly expands the PTO's functionality and allows the transmission to be ground driven in either rotational direction. Still further, the use of the electro-mechanical valve allows the clutch to be efficiently and reliably engaged and disengaged. Therefore, the PTO assembly may more efficiently and reliably provide hydraulic fluid to the system while the prime mover is shut down or unable to operate.

In one example, the electro-mechanical valve may be a solenoid valve that when energized causes mechanical disengagement of the disconnect clutch and when de-energized causes mechanical engagement of the disconnect clutch. In this way, the clutch is engaged to bring the bi-directional pump online when the prime mover is shut down and electrical power generation ceases, causing de-energization of the solenoid valve.

In another example, the disconnect clutch may include a first toothed face that is coupled to a first gear that meshes with a second gear which is coupled to an output shaft that includes an output interface. Further, in such an example, the disconnect clutch may include a second toothed face that is coupled to a shaft in the bi-directional pump. In this way, the clutch may be spaced efficiently incorporated into the transmission, thereby increasing PTO assembly compactness.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A power take-off (PTO) assembly with a disconnect clutch and a bi-directional pump for use with a hydraulic system is described herein. The PTO assembly is designed to operate when the transmission or other suitable system is ground driven and disconnected from the transmission when bi-directional pump operation is not desired. In this way, the PTO assembly can provide fluid to the transmission for lubrication and/or other purposes during operations when the prime mover is in shut down and vehicle wheels are rotating (e.g., during towing), to reduce the chance of component under-lubrication. Further, the PTO assembly is disengaged during prime mover operation to increase transmission efficiency when bi-directional pump operation would provide redundant hydraulic fluid flow. To achieve the aforementioned functionality, the PTO assembly includes an electro-mechanical valve that is used to engage and disengage the disconnect clutch which permits and inhibits torque transfer between a transmission, or other suitable system, and the bi-directional pump. Energization of the electro-mechanical valve may hold the disconnect clutch in disengagement and conversely energization of the valve may cause disconnect clutch engagement. The disconnect clutch is configured to disconnect the bi-directional pump from the transmission, or other suitable system, when a prime mover is in operation and mechanically connect the bi-directional pump to the transmission when the prime mover is shut down. Consequently, the transmission's hydraulic system is provided with hydraulic fluid during prime mover shutdown to reduce the likelihood of component degradation and/or provide other hydraulic functions, such as hydraulic steering functionality, for instance. Further, the use of the electro-mechanical valve which is controlled by a suitable controller, such as a transmission control unit (TCU), allows the PTO assembly to be more accurately and robustly engaged and disengaged when compared to manually adjusted PTO systems or hydraulically triggered actuators that passively engage and disengage a PTO system based on oil temperature.

Figure 1:
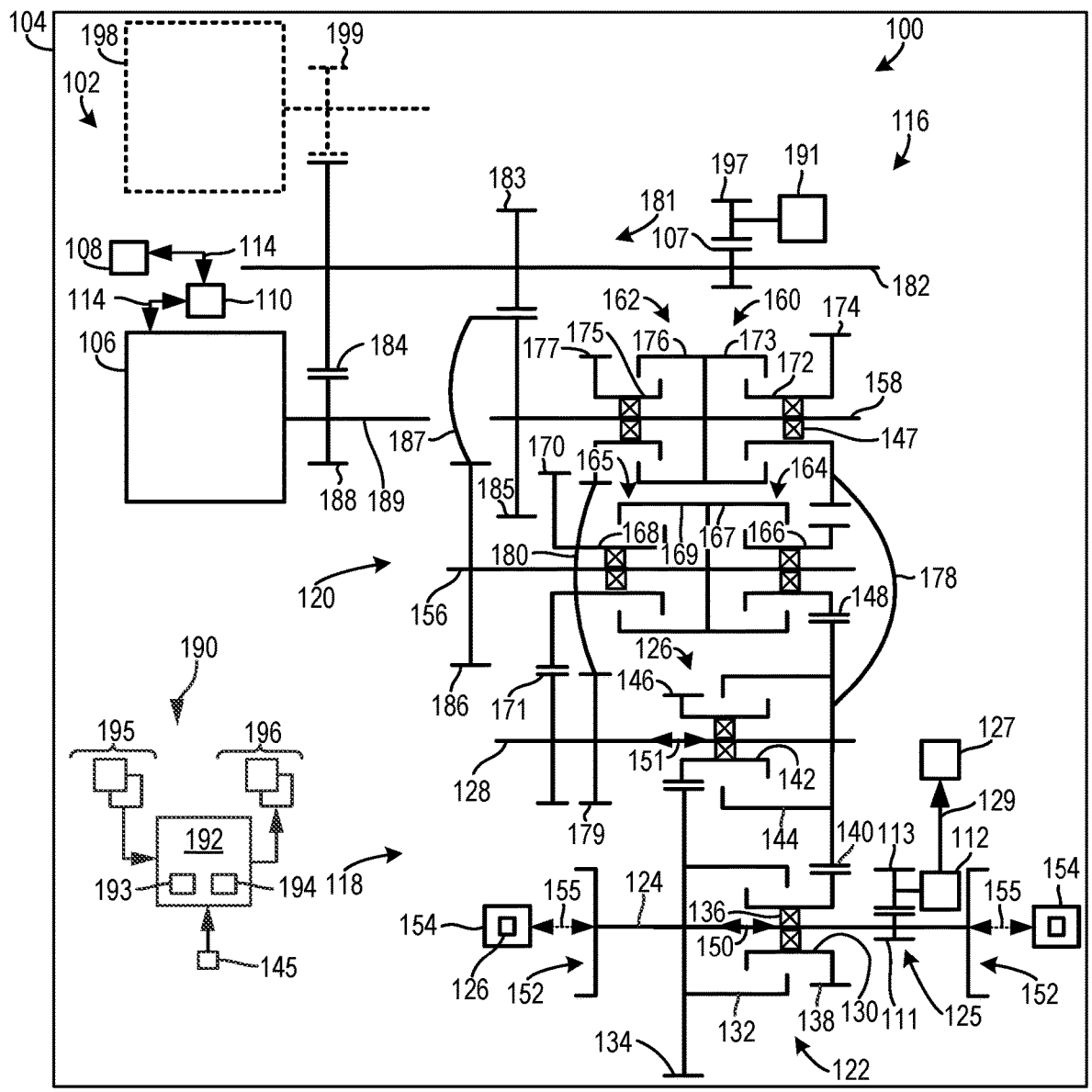
FIG. 1 is a schematic diagram of an electric drive unit with a transmission system including a power-take off (PTO) assembly.
Figure 2:
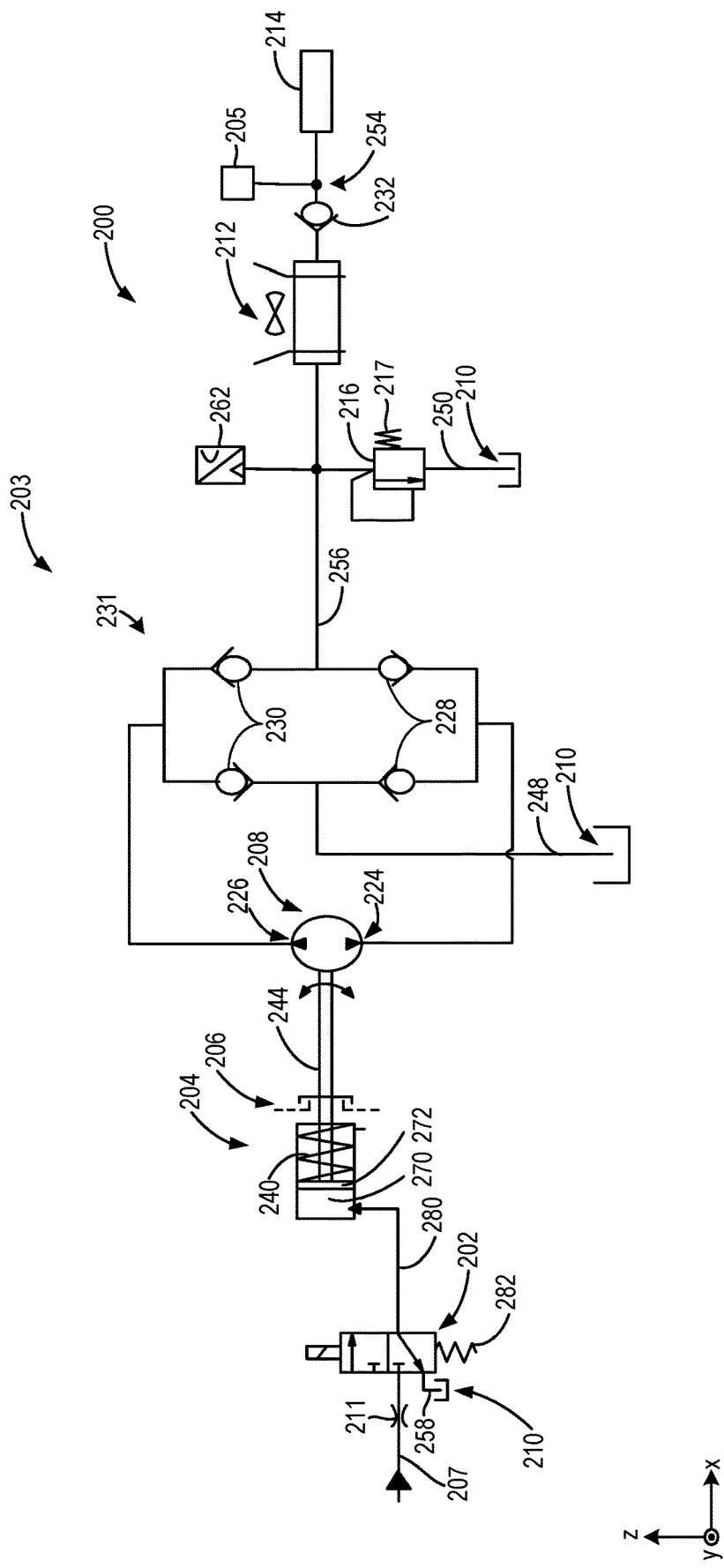
FIG. 2 is a schematic depiction of a PTO assembly and a lubrication system.
Figure 6:
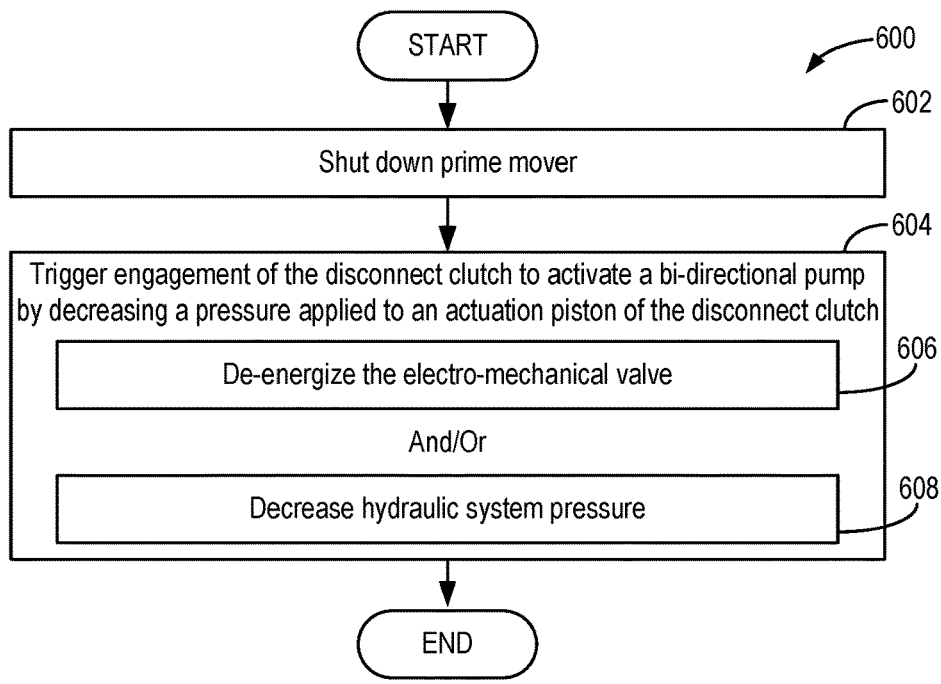
FIG. 6 is a method for operation of the disconnect clutch upon prime mover shut down.
Figure 7:
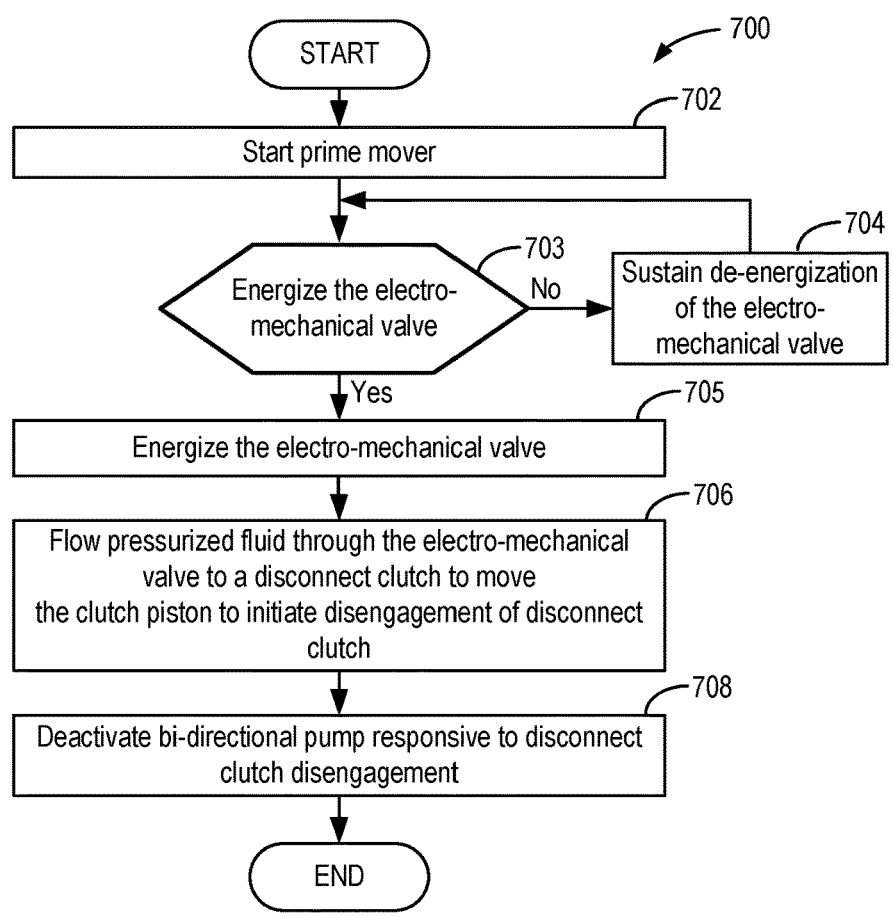
FIG. 7 is a method for operation of the disconnect clutch upon prime mover start up.

The PTO assembly described herein may be used in a transmission or other suitable system. An exemplary transmission system with a PTO assembly is shown in FIG. 1. A schematic diagram of an exemplary hydraulic circuit in a PTO assembly is depicted in FIG. 2. Illustrations of an exemplary PTO assembly and hydraulic system are shown in FIGS. 3, 4, 5A, and 5B. Methods of operation for the PTO assembly are depicted in FIGS. 6 and 7. A use-case scenario for operation of the PTO assembly is shown in a timing diagram of FIG. 8.

FIG. 1 depicts a transmission system 100 and a PTO assembly 112. The transmission system 100 is illustrated as one example of an operating environment for the PTO assembly 112. However, it will be understood that the PTO assembly may be used in a wide variety of systems.

The transmission system 100 in the illustrated example, may be included in an electric drive unit 102 of a vehicle 104 (e.g., a battery electric vehicle (BEV)), although alternative examples are possible such as a hybrid electric vehicle (HEV) that utilizes an internal combustion engine for propulsion and/or recharging of an energy storage device. Further, in other examples the transmission system may be utilized in a vehicle powertrain which solely utilizes an internal combustion engine as the prime mover.

The electric drive unit 102 generates motive power for vehicle propulsion. The vehicle 104 may be an on-highway vehicle (e.g., a sedan or a truck) or an off-highway vehicle (e.g., a material handling, mining, or railway vehicle). More generally, the vehicle 104 may be a light, medium, or heavy duty vehicle, for instance.

The electric drive unit 102 may include an electric motor 106 (e.g., an electric motor such as a traction motor). However, another suitable prime mover may be used in place of the electric motor 106 such as an internal combustion engine or hydraulic motor, in other examples. The electric motor 106 may include components such as a rotor and a stator that electromagnetically interact during operation to generate motive power. Further in one example, the electric motor may be a motor-generator which is designed to generate electrical energy during regeneration operation.

The electric motor 106 may be electrically coupled to one or more energy storage device(s) 108 (e.g., one or more traction batteries, capacitor(s), fuel cell(s), combinations thereof, and the like) by way of an inverter 110 when the machine is designed as alternating current (AC) machine. However, a direct current (DC) electric motor may be used in alternate examples.

Arrows 114 denote the electrical connection between the electric motor 106, the inverter 110, and the energy storage device(s) 108. The inverter 110 may be designed to convert direct current (DC) to AC and vice versa. In one use-case example, the electric motor 106 and the inverter 110 may be three-phase devices which can achieve greater efficiency when compared to other types of motors. However, motors and inverters designed to operate using an alternate number of phases have been envisioned.

The electric motor 106 may be rotationally coupled to the transmission system 100. Further, the transmission system 100 may include a multi-speed transmission 116 (e.g., a multi-speed gearbox) with multiple assemblies. When the multi-speed transmission is used in an EV it may be referred to as an electric multi-speed transmission. However, in other examples, the transmission may be a single speed transmission. More generally, FIG. 1 shows on possible transmission architectures. However, it will be appreciated that the transmission may have a variety of architectures, in other examples.

The multi-speed transmission 116 may include one or more clutch assemblies, such as a higher-lower range clutch assembly 118 and a multi-speed clutch assembly 120. The higher-lower range clutch assembly 118 may be positioned downstream of the multi-speed clutch assembly 120. The higher-lower range clutch assembly 118 may include a higher range clutch 122 positioned coaxial to an output shaft 124 and a lower range clutch 126 positioned coaxial to a first layshaft 128. However, in another example, the higher range clutch may be positioned coaxial to the first layshaft and the lower range clutch may be positioned coaxial to the output shaft. It will be understood, that other clutch architectures in the transmission may be used. For instance, the number, positioning, and/or type of clutches used in the transmission may be altered to meet different end-use design goals.

The higher range clutch 122 as well as the other clutches described herein may be friction clutches (e.g., wet friction clutches). The friction clutches described herein may be operated with varying amounts of engagement (e.g., continuously adjusted through the clutch's range of engagement) of friction plates and spacers. Further, the friction clutches described herein may be wet friction clutches through which fluid (e.g., oil) is routed to increase clutch longevity. For instance, hydraulically operated pistons may be used to induce clutch engagement and disengagement. However, solenoids may be used for electro-mechanical clutch actuation, in other examples. Using friction clutches allows power interruptions during shifting transients to be reduced, thereby increasing transmission performance. However, other types of clutches, such as dog clutches, may be used in the transmission, in other examples.

In the friction clutch example, the higher range clutch 122 includes an inner carrier 130 and an outer carrier 132. The inner carrier 130 has a first set of plates mounted thereto and the outer carrier 132 has a second set of plates mounted thereto. These plates may frictionally engage when the clutch is closed to permit torque transfer from the inner carrier 130 to the outer carrier 132. Conversely, when the clutch is open the plates may frictionally disengage. As such, the clutch may be in an engaged state when it is closed and a disengaged state when it is open. The outer carrier 132 may be fixedly coupled to a gear 134 that is fixedly coupled to the output shaft 124. A bearing 136 may serve as the rotational connection between the inner carrier 130 and the output shaft 124. The bearing 136 as well as the other bearings described herein may include an inner race, an outer race, and roller elements (e.g., cylindrical rollers, tapered rollers, balls, and the like). The inner clutch carriers, depicted in FIG. 1, are shown coupled to a single bearing. However, it will be understood that the clutch carriers may be coupled to multiple bearings, in other examples. Further, the inner carrier 130 is fixedly coupled to a gear 138 which meshes with a gear 140 that is rotationally coupled to the first layshaft 128.

Again in the friction clutch example, the lower range clutch 126 includes an inner carrier 142 and an outer carrier 144 which each have different sets of plates mounted thereto and functions in the similar manner to the higher range clutch 122 with regard to plate engagement and disengagement. The other friction clutches of the multi-speed transmission 116 described herein also includes plates the function in a similar manner and repeated description of the plates is omitted for brevity. The inner carrier 142 may be fixedly coupled to a gear 146 that meshes with the gear 134. Conversely, the outer carrier 144 may be fixedly coupled to the gear 140 that meshes with the gear 138 and a gear 148.

In the illustrated example, the higher and lower range clutches 122 and 126 are axially offset along their rotational axes 150 and 151. In this way, the transmission's space efficiency is increased when compared to clutches that have the same position along their respective rotational axes. However, in other examples, the higher and lower range clutches may have alternate axial positions.

As illustrated, the output shaft 124 may include two mechanical interfaces 152 which are designed to mechanically attach to downstream driveline components such as shafts, joints, and the like that transfer mechanical power to drive axle assemblies 154 which may each include a differential, axle shafts (e.g., half shafts), drive wheels, and the like. This mechanical power transfer is denoted via arrows 155. In other examples, the output shaft 124 may include one mechanical interface or more than two mechanical interfaces.

The output shaft 124 has a PTO gear set 125 coupled thereto, in the illustrated example. To elaborate, the PTO gear set 125 includes a gear 111 which meshes with a gear 113. Gear 113 is rotationally coupled to a PTO assembly 112, in the illustrated example. However, in alternate examples, the PTO assembly 112 may receive mechanical power using another suitable mechanical connection and/or be positioned in another suitable location within the transmission or powertrain, in other examples, as described in greater detail herein.

The PTO assembly 112 is driven via rotation of drive wheels 157 which transfer torque to the output shaft 124. The drive wheels are included in drive axle assemblies 154, in the illustrated example. As such, the PTO assembly 112 may be referred to as a ground driven PTO assembly. Driving the PTO assembly in this manner occurs during towing operation and vehicle coasting, for example. Towing operating as described herein is an operating condition where the prime mover is not in operation and vehicle drive wheels are rotating due to the vehicle 104 being attached to a tow vehicle (e.g., tow truck).

In the illustrated example, the PTO assembly 112 provides hydraulic fluid (e.g., mineral based and/or synthetic oil) to a hydraulic system 127 which in turn delivers the hydraulic fluid to components in the transmission with hydraulic needs such as the clutches, bearings, a steering system, and the like. Arrow 129 denotes the fluidic connection between the PTO assembly 112 and the hydraulic system 127 which is expanded upon herein with regard to FIGS. 2-5B. However, in other examples, the PTO assembly may deliver hydraulic fluid directly to the hydraulic components.

In one example, the PTO gear set 125 may be incorporated into the PTO assembly 112 and the PTO assembly may be formed as a unit that is removably coupled to the output shaft 124. In this way, the PTO assembly 112 may be more efficiently incorporated into the transmission at a later stage in the manufacturing process, if desired, when compared to PTOs that are attached to the transmission at upstream locations. More generally, designing the PTO assembly and gears as an integrated unit allows the PTO assembly to be more easily incorporated into a wide variety of vehicle platforms to expand the vehicle's functional capabilities.

As indicated above, the transmission 116 may have a variety of different architectures. For instance, the number of shafts, gears, and other transmission components may be altered based on the system's end-use design goals. As an example, the number of speeds in the transmission may be increased or decreased by increasing or decreasing the number of clutches and/or types of clutches utilized in the transmission. Further still in other examples, single speed or continuously variable transmissions may be utilized.

The PTO gear set 125 and the PTO assembly 112 may be positioned in other locations in the transmission, in other examples. For instance, the PTO gear set may be rotationally coupled to another suitable shaft such as an intermediate shaft (e.g., an idler shaft), an input shaft, and the like and/or include a different number of gears. Further, the PTO assembly may be coupled to the transmission using additional or alternate suitable mechanical components such as one or more belts, chains, shafts, combinations thereof, and the like.

In the illustrated example, the multi-speed clutch assembly 120 includes two or more clutches arranged on a second layshaft 156 and a third layshaft 158. To elaborate, in the illustrated example, a first pair of clutches which includes a first gear clutch 160 and a third gear clutch 162 are positioned coaxial to the third layshaft 158 and a second pair of clutches which includes a second gear clutch 164 and a fourth gear clutch 165 are positioned coaxial to the second layshaft 156. However, other clutch arrangements have been contemplated.

The second gear clutch 164 may include an inner carrier 166 and an outer carrier 167. The inner carrier 166 may be fixedly coupled to the gear 148 that meshes with the gear 140. The outer carrier 167 may be fixedly coupled to the second layshaft 156.

The fourth gear clutch 165 may include an inner carrier 168 and an outer carrier 169. The inner carrier 168 may be fixedly coupled to a gear 170 that meshes with a gear 171 on the first layshaft 128. The outer carrier 169 may be again fixedly coupled to the second layshaft 156.

The first gear clutch 160 may include an inner carrier 172 and an outer carrier 173. The inner carrier 172 may be fixedly coupled to a gear 174 that is rotationally coupled to the gear 140 as denoted via curved line 178. In other words, the gear 174 may mesh with the gear 140. However, in other examples, the gear 174 may be coupled to the gear 140 via a mechanical coupling such as one or more gears, shafts, joints, and the like. The inner carrier 172 may be fixedly coupled to the third layshaft 158.

The third gear clutch 162 may include an inner carrier 175 and an outer carrier 176. The inner carrier 175 may be fixedly coupled to a gear 177 that is rotationally coupled to a gear 179 on the first layshaft 128 as denoted via curved line 180. In other words, the gear 177 may mesh with the gear 179. However, in other examples, the gear 177 may be coupled to the gear 179 via a mechanical coupling such as one or more gears, shafts, joints, and the like. The inner carrier 175 may be fixedly coupled to the third layshaft 158.

The multi-speed transmission 116 further includes, in the illustrated example, an input assembly 181 that includes an input shaft 182 with a gear 183 and a gear 184 fixedly coupled thereto. The gear 183 meshes with a gear 185 that is fixedly coupled to the third layshaft 158. The gear 185 is rotationally coupled to a gear 186 that is fixedly coupled to the second layshaft 156 as denoted via curved line 187. In other words, the gear 185 may mesh with the gear 186. However, in other examples, the gear 185 may be coupled to the gear 186 via a mechanical coupling such as one or more gears, shafts, joints, and the like. Further, the gear 184 meshes with a gear 188 that is rotationally coupled to an electric motor interface shaft 189. In turn, the electric motor interface shaft 189 is rotationally coupled to a rotor shaft in the electric motor 106.

Input shaft 182 further includes a gear 107 that is rotationally coupled thereto. Gear 107 may mesh with a gear 197, which may be rotationally coupled to a pump 191 (e.g., charging pump). As such, the electric motor 106 may provide mechanical power to the pump 191. The pump 191 may provide pressurized fluid (e.g., mineral based and/or synthetic oil) to clutches for actuation and/or lubrication as well as bearings and/or other components in the transmission with hydraulic fluid needs (e.g., fluid actuation and/or lubrication needs).

A second electric motor 198 may additionally be coupled to the multi-speed transmission 116, in one example, via a gear 199 that meshes with the gear 184. However, in other examples, the second electric motor 198 may be omitted from the electric drive unit 102.

The output shaft 124 may be arranged below the layshafts 128, 156, 158 as well as an input shaft 182. In this way, the transmission achieves a desired drop that has applicability in a wide range of vehicles. However, the output shaft may be positioned on another suitable location such as above at least one of the layshafts, in other examples.

The multi-speed transmission 116 may further include bearings 147 that are coupled to inner carriers of the clutches and the corresponding shafts that are coaxial to the inner carriers. In this way, the inner carriers can independently rotate with regard to the shafts when the clutches are disengaged.

The vehicle 104 may further include a control system 190 with a controller 192 (e.g., transmission control unit (TCU)) as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 192 may receive various signals from sensors 195 coupled to various regions of the vehicle 104 and the multi-speed transmission 116. For example, the sensors 195 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the electric motor. An input device 145 (e.g., accelerator pedal, brake pedal, drive mode selector, gear selector, combinations thereof, and the like) may further provide input signals indicative of an operator's intent for vehicle control.

Upon receiving the signals from the various sensors 195 of FIG. 1, the controller 192 processes the received signals, and employs various actuators 196 of vehicle and/or transmission components to adjust the components based on the received signals and instructions stored on the memory of controller 192. For example, the controller 192 may receive an accelerator pedal signal indicative of an operator's request for increased vehicle acceleration. In response, the controller 192 may command operation of the inverter 110 to increase the power delivered from the electric motor 106 to the multi-speed transmission 116. The controller 192 may, during certain operating conditions, be designed to send commands to the clutches 122, 126, 160, 162, 164, 165, to engage and disengage the clutches. For instance, a control command may be sent to the higher range clutch 122 and in response to receiving the command, an actuator in the clutch may adjust the clutch based on the command for clutch engagement or disengagement. The other controllable components in the vehicle may function in a similar manner with regard to sensor signals, control commands, and actuator adjustment, for example. The methods, control schemes, and the like described herein may be implemented as instructions stored in the electronic storage medium 194 that are executable by the processor 193 of the controller 192.

An axis system is provided in FIG. 1 as well as FIGS. 2-5B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The multi-speed transmission 116 may be designed to operate with an equal number of forward and reverse driving gear modes. For instance, in the illustrated example, the transmission has eight forward and reverse gear modes. However, it will be appreciated that the transmission may be designed with a different number of gear modes which may be symmetric in some cases. For instance, the transmission may have two, three, four, or sixteen forward and/or reverse gear modes.

To operate the multi-speed transmission 116 in a reverse drive mode the electric motor 106 may spin the rotor shaft in an opposite direction as the forward drive mode. Designing the electric motor 106 in this manner allows the compactness of the transmission to be reduced when compared to transmissions with mechanical reverse assemblies. However, in other examples, the transmission may include a mechanical reverse that decreases the system's space efficiency.

The transmission 116 is described as one possible exemplary embodiment and that other configurations of exemplary transmission systems with other configurations of clutches, gears, and/or shafts are possible without departing from the scope of this disclosure. For instance, the electric motor 106 and/or the electric motor 198 may be replaced with internal combustion engine(s), in one example. In other examples, the multi-speed transmission may provide motive power to a first drive axle assembly while an internal combustion engine provides motive power to a second drive axle assembly. Still further, in other embodiments, an internal combustion engine may be provided to recharge the energy storage device(s) 108. However, it will be understood, that when the transmission is used in an all-electric vehicle, the system may be simplified thereby reducing manufacturing costs and the chance of component degradation.

FIG. 2 schematically illustrates a hydraulic system 200 and a PTO assembly 203. It will be understood that the PTO assembly 203 and the hydraulic system 200 depicted in FIG. 2 as well as the other PTO assemblies described herein may be included in the transmission system depicted in FIG. 1 or another suitable system. Further, at least a portion of the components, features, and the like in the PTO assembly 203 described herein may be included in the other PTO assemblies described herein and vice versa.

The hydraulic system 200 may be configured to hydraulically actuate multiple clutches and/or supply hydraulic fluid to one or more hydraulic devices (e.g., hydraulic steering components. The hydraulic system may include hydraulic valves, hydraulic lines, and the like to supply the lubricated components, steering system, and/or clutches with hydraulic fluid.

The hydraulic system 200 may include multiple hydraulic devices and a relief valve 216 in fluidic communication a fluid reservoir 210 (e.g., an oil sump). The hydraulic system 200 may receive hydraulic fluid (e.g., mineral based and/or synthetic oil) from the fluid reservoir 210. The hydraulic system 200 may function to provide fluid to components 214 (e.g., transmission components) with hydraulic fluid demands while the prime mover (e.g., an electric motor such as a traction motor and/or an internal combustion engine) is shut down. As indicated above, the components 214 may include lubricated components such as bearings, gears, and the like and/or hydraulically operated components such as clutches, a steering system, and the like. As described herein, prime mover shutdown is an operating condition where the prime mover is not generating and/or transferring mechanical power to downstream components.

During prime mover shut down, while the transmission output shaft, or other suitable shaft which is coupled to the PTO assembly, is rotating (during vehicle towing, for instance) the PTO assembly 203 is designed to provide hydraulic fluid to the component(s) 214 by way of the hydraulic system 200. It will be appreciated, that during prime mover shutdown, one or more pump(s) 205 (e.g., a lubricant pump and/or a hydraulic pump for clutches and/or steering systems) may not be in operation since they may be driven by the prime mover. In this way, the vehicle systems (e.g., the transmission, the steering system, and the like) can be provided with hydraulic fluid for lubrication, clutch actuation, steering functionality, and/or other uses during prime mover shutdown (e.g., towing), thereby increasing system longevity when compared to systems without ground driven PTO capabilities. The pump 205 may be in fluidic communication with a hydraulic line 256 at a junction 254. Further, the hydraulic line 256 is in fluidic communication with the hydraulic component(s) 214 (e.g., transmission system components).

The PTO assembly 203 includes a disconnect clutch 206 and a bi-directional pump 208 in a bi-directional pump assembly 231. Additionally, the PTO assembly 203 includes an electro-mechanical valve 202 (e.g., a solenoid valve).

A fluid supply line 207 is in fluidic communication with the electro-mechanical valve 202. The fluid pressure in the fluid supply line 207 may be proportional the fluid pressure in the hydraulic system 200. In this way, the electro-mechanical valve 202 sees the hydraulic system pressure. A restriction 211 may be positioned in the fluid supply line 207, in some examples. Further, in one example, hydraulic fluid may be returned through the electro-mechanical valve 202 to the fluid reservoir 210 (or other suitable sump) via a drain line 258 when the electro-mechanical valve is closed.

The electro-mechanical valve 202 is in fluidic communication with a hydraulic actuator 204. When the electro-mechanical valve 202 is energized and permitting fluid flow therethrough, pressurized fluid is supplied to the hydraulic chamber 270 from the electro-mechanical valve 202 via a hydraulic supply line 280. Conversely, when the electro-mechanical valve 202 is de-energized, hydraulic fluid is inhibited from flowing through the valve from the line 207 to the supply line 280. Further, a spring 282 is shown coupled to or incorporated into the electro-mechanical valve 202. However, other electro-mechanical valve designs have been contemplated. For instance, the valve may be opened and allowing fluid flow therethrough when it is de-energized and may be closed and inhibiting fluid flow therethrough when energized. Still further, in other examples, the electro-mechanical valve may be designed to be switched into both flow configurations via energization and the spring may be omitted from the valve.

Pressure within the hydraulic actuator 204 dictates the configuration of the disconnect clutch 206, in the illustrated example. Further, the operational state of the bi-directional pump 208 is dependent upon actuation state (engaged vs. disengaged) of the disconnect clutch 206.

In the illustrated example, the hydraulic actuator 204 includes a hydraulic chamber 270, an actuation piston 272, and a spring 240. However, hydraulic actuators with alternate configurations may be used in alternate embodiments. Although the disconnect clutch 206 and the hydraulic actuator 204 are separately illustrated in FIG. 2, the clutch actuator may be incorporated in the disconnect clutch, as will be described further below. The actuation piston 272 may be axially slidable in the hydraulic chamber 270. In some examples, the disconnect clutch 206 may be a hydraulically actuated dog clutch. However, other types of hydraulically operated clutches may be used in the PTO assembly in other examples.

The hydraulic actuator 204 is configured to adjust the disconnect clutch 206. To elaborate, the disconnect clutch 206 is designed to engage when the fluid pressure in the hydraulic chamber 270 drops below a threshold value (e.g., a positive non-zero value) to place the actuation piston 272 in a retracted position. To elaborate, reduction of pressure in the hydraulic chamber 270 reduces force on the spring 240, causing the spring 240 to return the actuation piston 272 to the retracted position, thereby engaging the disconnect clutch 206. The disconnect clutch 206 may be designed to disengage when the fluid pressure in the hydraulic chamber 270 is above the threshold value, as a result of hydraulic pressure in the hydraulic chamber 270, causing the actuation piston 272 to move into the extended position and the spring 240 to compress.

As indicated above, the electro-mechanical valve 202 is designed to induce engagement and disengagement of the disconnect clutch 206. To elaborate, when the electro-mechanical valve 202 is energized, hydraulic fluid is allowed to flow from the fluid supply line 207 and through the valve to the supply line 280 and then to the disconnect clutch hydraulic chamber 270 which disengages the clutch when the fluid pressure is greater than a threshold value. Conversely, when the electro-mechanical valve 202 is de-energized, fluid is inhibited from flowing through the valve and between fluid supply line 207 and the supply line 280. Therefore, during de-energization the pressure in the hydraulic chamber 270 drops and the disconnect clutch engages.

When the prime mover of the vehicle is switched from an operational state to a shutdown state, the electro-mechanical valve 202 is de-energized (e.g., automatically de-energized), thereby engaging the disconnect clutch 206 which allows the bi-directional pump 208 to be ground driven. Conversely, when the prime mover is operational, the electro-mechanical valve 202 is energized to disengage the disconnect clutch 206 which prevents the bi-directional pump 208 from being driven by the transmission. The specific conditions that may trigger electro-mechanical valve energization are expanded upon herein with regard to FIGS. 5A-7.

The bi-directional pump 208 may be a bi-directional fixed displacement hydraulic pump, in one example. To elaborate, the bi-directional pump 208 may be a positive displacement hydraulic pump having a housing and a pumping device (e.g., a reciprocating piston (e.g., check-ball piston pump) or rotary device) designed to deliver a pressurized fluid during each cycle, for instance. Further, the bi-directional pump 208 may be in fluidic communication with the fluid reservoir 210 via a pick-up line 248. Check valves 228 and 230 in a rectifying setup enable the bi-directional pump 208 to provide fluid (e.g., oil) to downstream components with rotational input in clockwise and counterclockwise directions, in the illustrated example. However, other pump setups that enable bi-directional functionality may be used in other example.

Further, the bi-directional pump 208 may provide hydraulic fluid to the transmission during operations, such as towing, in which prime mover is shut down and the output shaft is rotating in either a forward or a reverse direction as opposed to a uni-directional pump which can be solely driven in one rotational direction. In this way, the bi-directional pump 208 pressurizes and flows hydraulic fluid to the component(s) 214 via the hydraulic line 256, respectively. Further, the hydraulic line 256 may be in fluidic communication with one or more lubricated components of the transmission via one or more additional fluid lines. Still further, it will be appreciated that the pump input shaft 244 may be rotationally coupled to a transmission shaft such as an output shaft.

A first port 224 (e.g., an inlet) of the bi-directional pump 208 may be in fluidic communication with the first pair of check valves 228 and a second port 226 (e.g., outlet) of the bi-directional pump 208 may be in fluidic communication with the second pair of check valves 230. The first pair of check valves 228 may be configured to allow the flow of hydraulic fluid from the fluid reservoir 210 towards the second port 226. Check valves 228 and other check valves described herein allow one-way flow of hydraulic fluid when the pressure upstream of the valve exceed a threshold associated with the valve. The check valves 228 and 230 may be included in a bi-directional pump assembly 231.

The second pair of check valves 230 may be configured to allow flow of fluid from the second port 226 towards hydraulic line 256. The pairs of check valves allow the pump to receive rotational input in opposing directions and supply fluid to downstream components. Fluid may then flow into a heat exchanger 212 (e.g., an oil cooler) before passing another check valve 232 and then flowing to component(s) 214 in the system, such as the transmission system. The heat exchanger 212 may be configured to control temperature of the fluid supplied to the component(s) 214 when the prime mover is shut down and the bi-directional pump is providing fluid to the transmission, for instance. Conversely, when the prime mover is operating, a transmission cooler may be used to control the fluid temperature, in some examples. However, in other examples, the heat exchanger 212 may be positioned in a different location or be omitted from the system.

In the illustrated example, the hydraulic system 200 further includes the relief valve 216 which is in fluidic communication with the fluid reservoir 210, via fluid return line 250. However, the relief valve may be omitted from the system, in other examples. The relief valve 216 may be a hydraulically controlled valve designed for selectively discharging fluid back to the fluid reservoir 210 when the pressure in the hydraulic line 256 is above a threshold value. In this way, overpressure conditions in the hydraulic system 200, that may occur during cold starts, can be avoided, if desired. In the illustrated example, the relief valve 216 includes a spring 217 that dictates the pressure at which the valve opens. In this way, the relief valve 216 may be passively controlled (e.g., opened and/or closed) to avoid over pressure conditions in the hydraulic system 200. However, relief valves with alternate constructions have been envisioned.

As previously indicated, engagement of the disconnect clutch 206 actives the bi-directional pump 208 by enabling the transfer of rotational energy from a transmission shaft (e.g., transmission output shaft) to the pump input shaft 244 of the bi-directional pump 208. Rotation of the pump input shaft 244 in turns rotates the bi-directional pump 208, thereby allowing fluid to be drawn from the fluid reservoir 210 and delivered to the component(s) 214 for lubrication.

Hydraulic system 200 may further include a pressure sensor 262 (e.g., a pressure switch) which may be configured to provide feedback to a controller (e.g., a transmission control unit) which indicates whether the bi-directional pump 208 is disconnected (e.g., generating 0 bar), when the prime mover is in operation.

Figure 3:
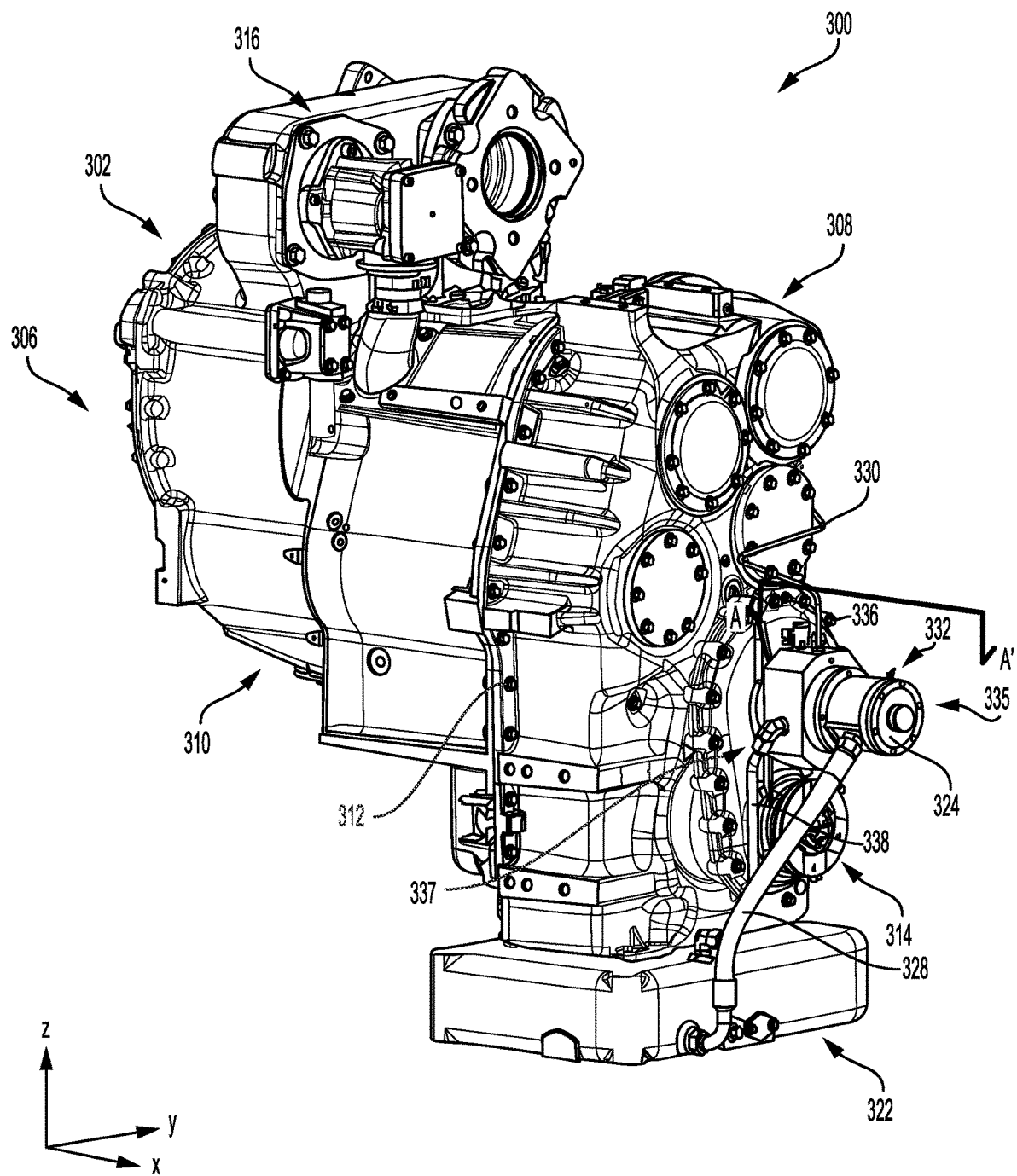
FIG. 3 is a perspective view of an exemplary transmission.

Now referring to FIG. 3, an example of a PTO assembly 335 that may be included in a multi-speed transmission 300, is shown. However, the PTO assembly may be included in another suitable system, in alternate embodiments. Further, the PTO assembly shown in FIG. 3 may share at least some similarities with the PTO assembly described with regard to FIG. 2.

The multi-speed transmission 300 includes a housing 302 with a prime mover interface shaft with an interface 306 that is profiled to attach a shaft of a prime mover. In the illustrated example, the housing 302 includes multiple sections 308 and 310 that are attached to one another via fasteners 312 and/or other suitable attachment mechanisms. However, other housing contours may be used in other examples.

The multi-speed transmission 300 may further include a fluid reservoir 322 (e.g., a sump) that houses hydraulic fluid, such as oil, for use by other components of the multi-speed transmission 300. The hydraulic fluid may be used for component lubrication and/or component actuation (e.g., clutch actuation). The housing 302 at least partially encloses an input assembly, a range clutch assembly, and a multi-speed clutch assembly, in some examples.

The PTO assembly 335 includes a bi-directional pump 324 that is configured to pump fluid to a hydraulic system. Pressurized fluid from the transmission or other suitable system may enter the PTO assembly 335 via a supply line 330. Hydraulic fluid may drain from the PTO assembly via a drain line 338. The bi-directional pump 324 may be configured to, when activated, draw fluid from the fluid reservoir 322 via a pick-up line 328 and deliver the fluid to downstream components via an outlet port 332.

A PTO housing 337 may at least partially surround and retain the components in the PTO assembly 335. The PTO housing 337 may efficiently attach to the housing section 308 using fasteners 336 and/or other suitable attachment devices.

A mechanical output interface 314 is further included in the multi-speed transmission 300. The output interface 314 may be provided on an end of a transmission output shaft. The mechanical output interface 314 may be positioned below the electric motor interface. In this way, the transmission may achieve a desired amount of drop. However, other transmission input and output interface arrangements have been contemplated.

A pump 316 (e.g., charging pump) may further be included in the multi-speed transmission 300. The pump 316 may be driven by a shaft (e.g., an input shaft) in the multi-speed transmission 300, in one example. The pump 316 is designed to provide pressurized fluid (e.g., oil) to components of the transmission such as clutches for actuation and/or lubrication, bearings, and the like, in one example. Pressurized fluid provided by the pump 316 may be delivered towards the PTO assembly 335 in order to open a disconnect clutch. The pump may be a suitable type of pump such as a positive displacement pump. A-A' denotes the cutting plane for the cross-sectional views depicted in FIGS. 4-5B.

Figure 4:
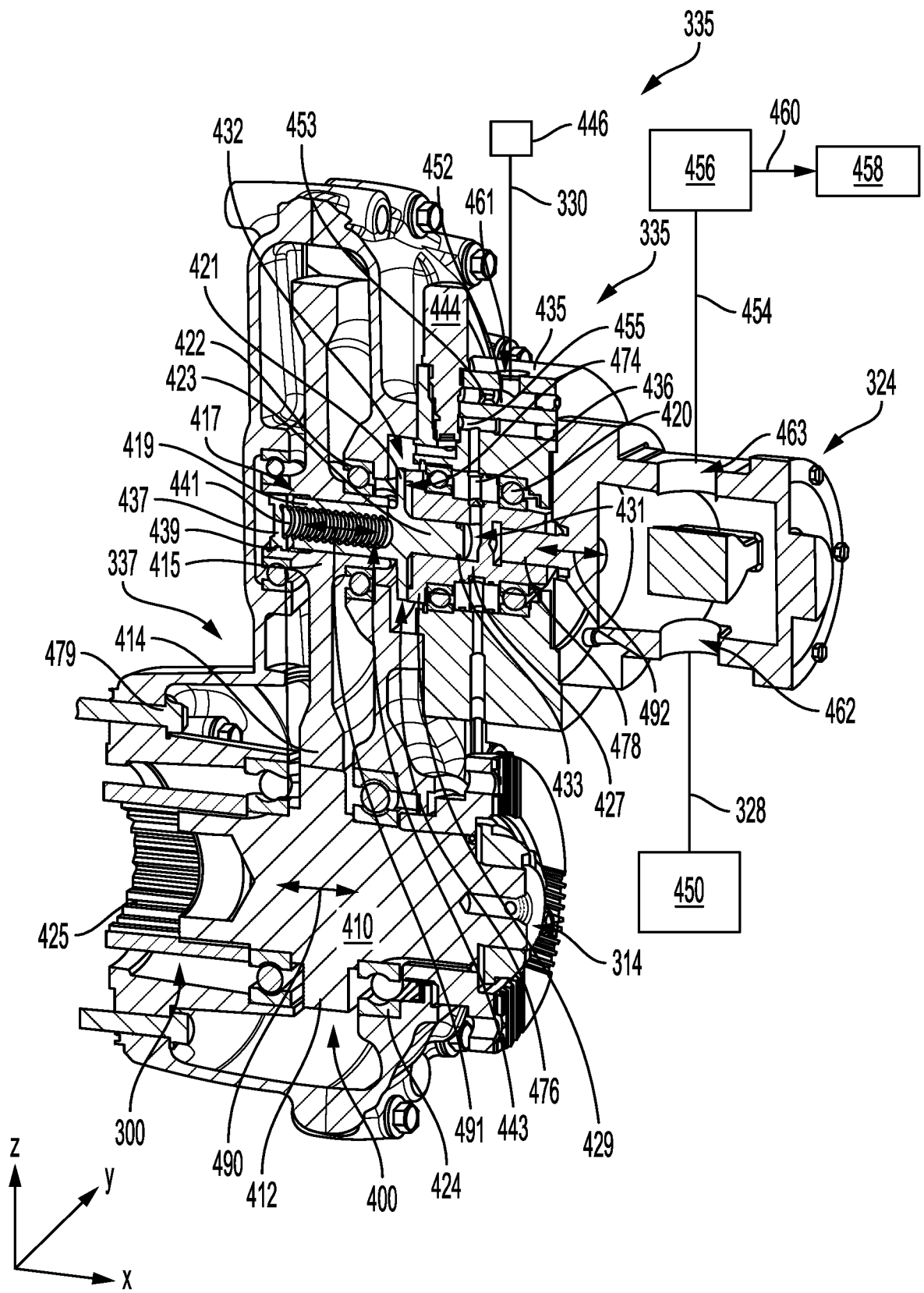
FIG. 4 is cross-sectional view an exemplary ground driven PTO assembly in the transmission depicted in FIG. 3.

FIG. 4 illustrates a cross-sectional view of the PTO assembly 335 that is coupled to an output shaft 410 of the transmission 300 via a PTO gear set 400. The transmission may include the output shaft 410 that is coupled to other components within the transmission such as gears, shafts, and/or clutches. However, as previously discussed, the PTO assembly 335 may be coupled to another suitable shaft in the transmission or incorporated into another suitable system.

The output shaft 410 may have the mechanical output interface 314 attached thereto or incorporated therein. The mechanical output interface 314 may be profiled to mechanically attach to downstream driveline components such as shafts, joints, and the like that transfer mechanical power to one or more drive axle assemblies. The drive axle assemblies may include or be rotationally coupled to drive wheels of the vehicle such that when the output shaft rotates, the wheels rotate and vice versa. Consequently, during operations in which the prime mover is not providing power to the transmission 300, such as during a tow operation, the output shaft may rotate as a consequence of the wheels rotating. Such rotation of the output shaft may in turn lead to rotation of other components of the transmission, such as gears within the PTO gear set 400 as well as other shafts and gears of the transmission. Without power from the prime mover, the pump 316 which provides fluid to transmission components, shown in FIG. 3, may not be operational. The PTO assembly 335 is designed to provide hydraulic fluid for lubrication and/or other functions during prime mover shutdown to fill in for operation of the charging pump which is not operational during prime mover shutdown.

The PTO gear set 400 may include a gear 412 that is directly coupled to or formed integrally with the output shaft 410. For instance, the gear 412 and the shaft 410 may be manufactured together via machining, casting, combinations thereof, and the like. However, in other examples, the gear 412 may be splined, attached via fasteners, press-fit, combinations thereof, and the like to the shaft 410. Bearings 424 may support and facilitate rotation of the output shaft 410. Further, the output shaft 410 may include splines 425 which facilitate efficient attachment to another section of the output shaft that extends from the transmission enclosure. The bearings 424 may reside in the PTO housing 337.

The gear 412 may mesh with a gear 414. The gear 414 and other components herein described may be contained within the PTO housing 337. The gear 414 may be fixedly coupled or integrally formed in a shaft 415. Bearings 422, retained in the PTO housing 337, are coupled to the shaft 415 and permit rotation thereof. However, in other examples, the bearings 422 may be retained in the transmission housing.

In the illustrated example, the shaft 415 includes an opening 417 in which an extension 419 of a disconnect clutch 432 is positioned. The extension 419 specifically axially protrudes from a flange 421 which includes a toothed face 474. The extension 419 may be axially slidable within the shaft 415 but able to transfer mechanical energy between the clutch and the shaft 415. To accomplish this functionality, the shaft 415 and the extension 419 may each include axially extending splines that are mated with one another. As such, the shaft may include interior splines and the extension 419 may include exterior splines.

A hydraulic actuator in the form of an actuation piston 423 and a hydraulic chamber 431 is further included in the disconnect clutch 432, in the illustrated example. The actuation piston 423 protrudes from the flange 421 in the opposite axial direction as the extension 419. The actuation piston 423 mates with a recess in a section of the disconnect clutch 432 that includes a flange 429. The flange 429 includes a toothed face 476 that is designed to engage with the toothed face 474 and permit torque transfer therethrough when the clutch is engaged.

Further, in the illustrated example, the hydraulic chamber 431 is formed in the recess of clutch section 427. The hydraulic chamber receives fluid for clutch actuation, as expanded upon herein with regard to FIGS. 5A and 5B. A seal 433 may be provided around the actuation piston 423 to reduce the chance of fluid leakage from the hydraulic chamber 431.

Bearings 420 may be positioned between the clutch section 427 and a section 435 of the PTO housing 337. In this way, the disconnect clutch is able to rotate within the housing. The housing section 435 may be adjacent to (or directly coupled to) the bi-directional pump 324. The bearings 420 may be axially spaced apart to enable a fluid supply passage 436 to extend there between and connect with the hydraulic chamber 431.

A stop 437 may be retained within the shaft 415 and a spring 441 may be axially delimited via the stop. The stop 437 allows the spring 441 to be compressed when the disconnect clutch 432 is disengaged. In the illustrated example, the spring 441 is arranged in a cavity 443 of the extension 419. In this way, the space efficiency of the clutch actuator is increased. However, in other examples, the spring may be positioned external to the extension 419. A seal 439 may circumferentially surround the stop 437 to reduce the chance of fluid leakage from the clutch.

An electro-mechanical valve 444 (e.g., a solenoid valve) is further included in the PTO assembly 335. The electro-mechanical valve 444 is configured to permit and inhibit fluid flow to the fluid supply passage 436 from a fluid source 446. The fluid source 446 may be a hydraulic system. As such, the pressure of the fluid supplied to the valve 444 from the fluid source 446 may be proportional to the pressure of the fluid in the hydraulic system. To elaborate, the supply line 330 (which is schematically depicted in FIG. 4) fluidly connects the fluid source 446 and a fluid port 461 in the PTO housing section 435. A fluid passage 452 fluidly connects the port 461 and the electro-mechanical valve 444. A restriction 453 may be positioned in the fluid passage 452 to increase fluid velocity. A fluid passage 455 fluidly connects the electro-mechanical valve 444 and the fluid supply passage 436.

The electro-mechanical valve 444 permits and inhibits fluid flow between the fluid passage 452 and the fluid passage 455 in response to energization and de-energization, respectively, of the valve. As such, movement of the electro-mechanical valve 444 allows the pressure of the fluid delivered to the actuation piston 423 in the disconnect clutch 432 to be adjusted to engage and disengaged the clutch, which in turn permits and inhibits the bi-directional pump 324 from being driven by rotational input from the transmission.

Energization of the electro-mechanical valve 444 inhibits operation of the bi-directional pump 324 and de-energization of the electro-mechanical valve 444 permits operation of the bi-directional pump. As such, during vehicle shutdown, the electric power delivered to the electro-mechanical valve 444 may be automatically discontinued to enable the bi-directional pump to be reliably rotationally coupled to the transmission during vehicle shutdown. As such, the hydraulic system may be supplied with fluid when the vehicle is shut down but the wheels are rotating, such as during towing operation. Consequently, the chance of transmission component degradation caused by the lack of lubrication during towing is avoided. As a result, transmission longevity is increased.

The electro-mechanical valve 444 may be energized and de-energized via a controller such as a TCU. The methods, control techniques, and the like for the PTO assembly expanded upon herein may be stored as instructions in memory of the controller that is executable by a processor of the controller.

Hydraulic fluid (e.g., mineral based and/or synthetic oil) stored within a fluid reservoir 450 (e.g., a sump) may be pumped into a port 462 (e.g., inlet) of the bi-directional pump 324 via a pick-up line 328, which is schematically depicted in FIG. 4. The fluid may then be pumped out of the bi-directional pump 324 (via a port 463) to hydraulic system 456 through a fluid line 454. Fluid within the hydraulic system 456 may be directed via one or more fluid lines, conduits, and the like towards components 458 of the hydraulic system, indicated by arrow 460.

In the illustrated example, the disconnect clutch 432 is a dog clutch. To elaborate, the disconnect clutch 432 is a dog clutch with the toothed face 474 and the toothed face 476, as previously indicated. The toothed face 474 is rotationally coupled to the gear 414 and the toothed face 476 is rotationally coupled to an input shaft 478 of the bi-directional pump 324. As such, mating of the toothed faces, during clutch engagement enables rotational energy to be transferred from the PTO gear set 400 to the bi-directional pump 324. Conversely, during clutch disengagement, the toothed faces 474 and 476 are spaced away from one another, thereby inhibiting rotational energy transfer between the PTO gear set 400 and the bi-directional pump 324. However, in alternate examples the dog clutch may include splined interfaces or another suitable type of clutch may be utilized, such as a friction clutch. However, the dog clutch may exhibit greater space efficiency and reliability when compared to other types of clutches, such as friction clutches.

The PTO assembly 335 may be formed as an interconnected unit that is able to be efficiently moved into position and coupled to the transmission housing. To elaborate, the PTO housing 337 may include fasteners 479 that extend therethrough and are profiled to attach to the transmission housing. Consequently, the PTO assembly 335 is capable of being efficiently incorporated into the transmission at a later stage in manufacturing, when compared to PTOs that are attached to other transmission shafts, such as the input shaft or idler shafts. As a result, the manufacturing process achieves greater adaptability and the PTO assembly may be used in a wider variety of transmissions, thereby increasing customer appeal. However, other PTO assembly constructions have been contemplated.

Rotational axes 490, 491, 492 of the output shaft 410, the shaft 415, and the bi-directional pump 324, respectively, are provided for reference. It will be understood that the axes 491 and 492 are positioned coaxial to one another, in the illustrated example, to increase PTO assembly compactness. However, in alternate examples, the axes 491 and 492 may not be aligned with one another. Further, the rotational axis 490 is parallel to the rotational axes 491 and 492, in the illustrated example. However, the axes may have alternate suitable orientations, in alternate examples.

Figure 5A:
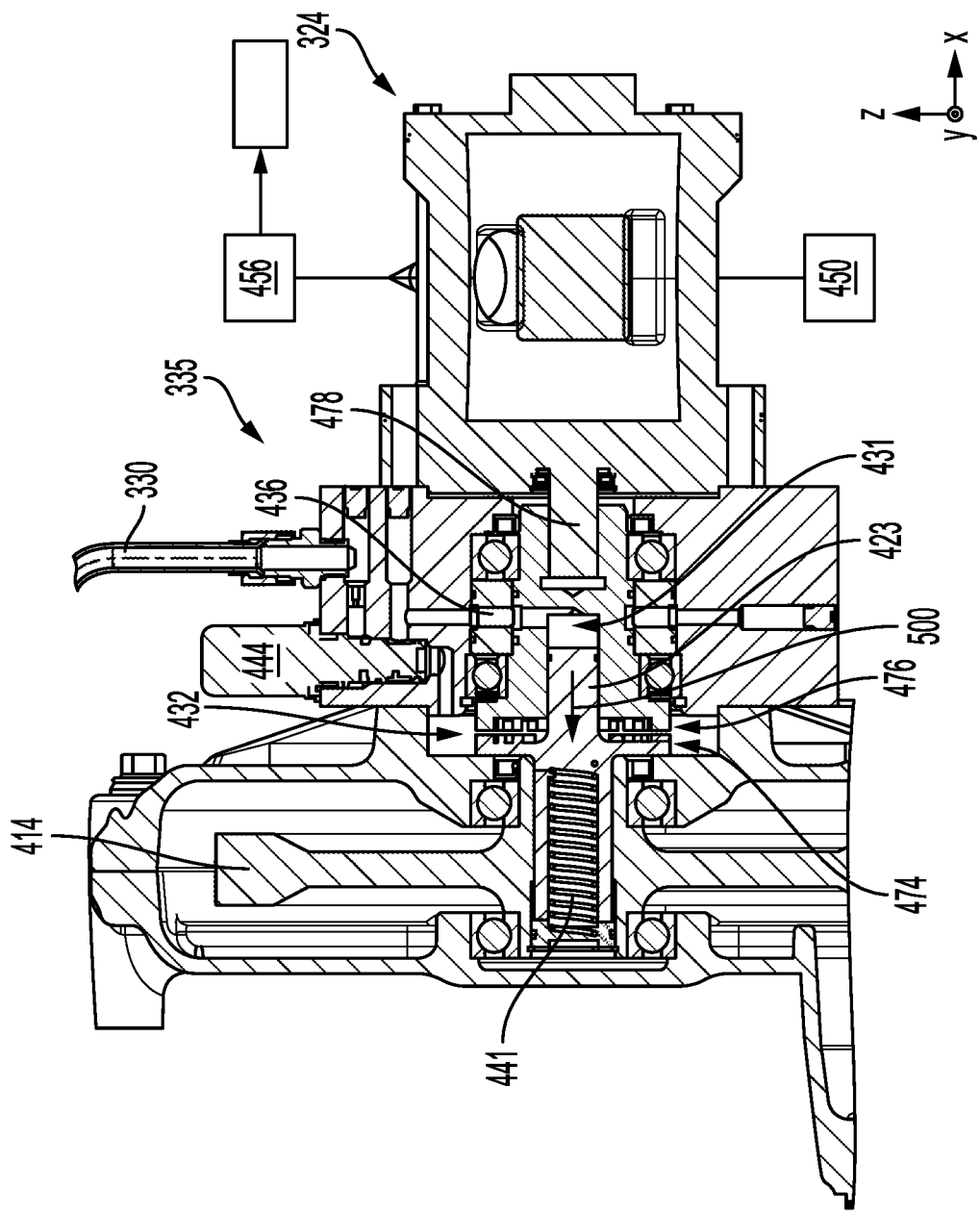
FIG. 5A is a cross-sectional view of the PTO assembly, depicted in FIG. 4, with a disconnect clutch in a disengaged state.
Figure 5B:
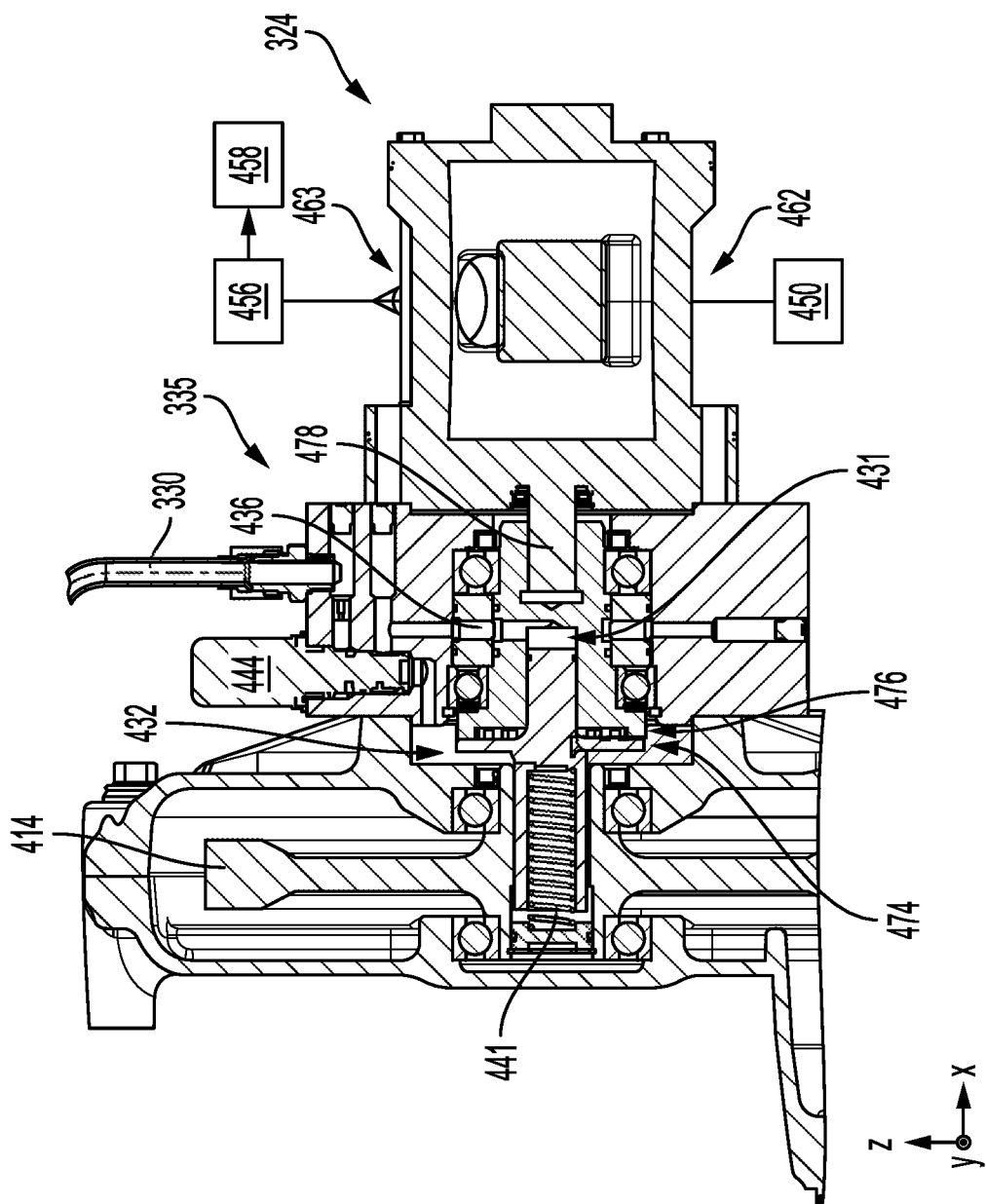
FIG. 5B is a cross-sectional view of the PTO assembly, depicted in FIG. 4, with the disconnect clutch in an engaged state.

FIGS. 5A and 5B illustrate the PTO assembly 335 in different configurations. FIG. 5A specifically depicts the PTO assembly 335 with the disconnect clutch 432 disengaged and FIG. 5B conversely depicts the PTO assembly 335 with the disconnect clutch 432 engaged. In this way, the bi-directional pump 324 may be rotationally decoupled from and coupled to the transmission.

As shown in FIG. 5A the disconnect clutch 432 is disengaged. Clutch disengagement occurs when the prime mover, connected to the transmission, is in operation and the transmission pump (which may be driven by the prime mover) is supplying pressurized hydraulic fluid to the transmission.

FIG. 5A shows the electro-mechanical valve 444 in an energized state. The electro-mechanical valve may be energized by the controller when the engine is in operation. To elaborate, the valve may be energized when the prime mover speed exceeds a threshold value, when the prime mover speed has exceeded a threshold value for a predetermined duration, or when the prime mover's output shaft has exceeded a threshold number of revolutions. In this way, the disconnect clutch is disengaged by the electro-mechanical valve when there is a high confidence that the transmission is receiving a desired amount of hydraulic fluid from the transmission pump.

In the energized state, the electro-mechanical valve 444 permits fluid flow from the supply line 330 to the fluid supply passage 436 and the hydraulic chamber 431 for the disconnect clutch 432. To elaborate, when the pressure of the fluid in the hydraulic chamber 431 that is exerted on the actuation piston 423 is above a threshold pressure that corresponds to clutch disengagement, the disconnect clutch 432 is disengaged. The threshold pressure may be dictated by the constant of the spring 441. To expound, the pressure in the chamber moves the actuation piston 423 in direction 500 to disengage the toothed faces 474 and 476 in the disconnect clutch. As such, the spring 441 is in a compressed state in FIG. 5A. In this way, mechanical power transfer from the gear 414 to the bi-directional pump input shaft 478 is inhibited. Thus, the bi-directional pump 324 is not operational in FIG. 5A and fluid flow from the fluid reservoir 450 to the hydraulic system 456 does not occur.

Conversely, FIG. 5B shows the disconnect clutch 432 in an engaged configuration, during prime mover shutdown. During these conditions, the electro-mechanical valve 444 is de-energized and inhibiting fluid flow from the supply line 330 to the fluid supply passage 436 and the hydraulic chamber 431 for the disconnect clutch 432. When the hydraulic chamber 431 is depressurized or the fluid pressure drops below the threshold value, the spring 441 decompresses and urges the toothed faces 474 and 476 into engagement. In this way, mechanical power transfer from the gear 414 to the bi-directional pump input shaft 478 is permitted. Thus, the bi-directional pump 324 is operational in FIG. 5B and fluid flow from the fluid reservoir 450 to the hydraulic system 456 and from the hydraulic system to the components 458 occurs when the transmission is being ground driven.

With the disconnect clutch 432 engaged, rotational torque is able to be transferred from the gear 414 to the bi-directional pump 324 via the input shaft 478, as described above. Fluid is consequently pumped from the fluid reservoir 450 to the hydraulic system 456 via the bi-directional pump 324. The hydraulic fluid enters the pump via the port 462 and exits the pump via port 463.

It will be appreciated that due to the configuration of the disconnect clutch hydraulic actuator, the bi-directional pump 324 will continue to provide fluid to the transmission until the charging pump, driven by the prime mover, generates a hydraulic pressure greater than a threshold value. As such, both the bi-directional pump and the lubrication pump may be concurrently operated for a brief duration after prime mover start up. However, once the fluid pressure surpasses the threshold, the bi-directional pump is passively disconnected. In this way, the chance of the transmission not receiving a target amount of hydraulic fluid during prime mover start up is decreased, thereby increasing transmission longevity.

FIG. 6 depicts a method 600 for a PTO assembly and hydraulic system. The method 600 occurs when the prime mover transitions from an operation state to a shutdown state. The method 600 may be carried out by a PTO assembly and/or hydraulic system such as any of the previously described PTO assemblies and hydraulic systems or combinations thereof. However, in other examples, the method 600 may be implemented in other suitable PTO assemblies and/or hydraulic systems. At least a portion of the steps in the method are passively implemented based on hydraulic fluid pressure within the hydraulic system. To elaborate, step 602 and step 606 are active steps and step 608 may be a passive action that occurs as a consequence of the active step 602. Instructions for carrying out the active steps may be stored as instructions in memory of a controller that is executable by a processor of the controller, as previously discussed.

Prior to the start of method 600, the prime mover is in operation. As such, during prime mover operation, pressurized fluid is directed from the hydraulic system to the disconnect clutch in the PTO assembly. To elaborate, while the prime mover is operating, pressurized fluid from the hydraulic system flows through the electro-mechanical valve and into the hydraulic chamber of the disconnect clutch hydraulic actuator, sustaining disconnect clutch disengagement. Disengagement of the disconnect clutch inhibits mechanical power transfer from the transmission to the bi-directional pump.

At 602, the method 600 includes shutting down the prime mover (e.g., a traction motor or internal combustion engine). Method 600 then proceeds to 604.

At 604, the method 600 includes triggering engagement of the disconnect clutch to activate a bi-directional pump by decreasing a pressure applied to an actuation piston of the disconnect clutch. When the pressure applied to the piston drops the toothed interfaces in the clutch engage due to spring decompression. At 606 the method includes de-energize the electro-mechanical valve. De-energizing the electro-mechanical valve blocks fluid flow from the hydraulic system to the clutch's hydraulic piston, causing clutch engagement. At 608, the method includes decreasing hydraulic system pressure. This pressure decrease may occur as a result of the prime mover shutting down. Method 600 then proceeds to 606.

Engagement of the disconnect clutch permits torque transfer from the transmission to the bi-directional pump. The bi-directional pump therefore pumps fluid from the sump to the hydraulic system of the transmission when the transmission output shaft rotates, such as during a tow operation in which one or more wheels are in contact with a ground surface. In this way, the likelihood of component degradation caused by improper component lubrication during towing is decreased. As a result, the longevity of the transmission is increased.

FIG. 7 depicts another method 700 for operation of the PTO assembly and hydraulic system. The method 700 occurs when the prime mover transitions from a shutdown state to an operation state. The method 700 is carried by the PTO assembly and hydraulic system used to implement the method 600. Further, at least a portion of the steps in the method 700 are passively implemented based on fluid pressure within the hydraulic system. To elaborate, steps 702 and 704 are active steps and steps 706 and 708 are passive actions that occur as a consequence of the active steps.

Prior to the start of method 700, the prime mover is shut down and the bi-directional pump in the PTO assembly therefore delivers fluid to the transmission when the output shaft is rotating (e.g., during towing or when the prime mover in non-operational and the vehicle is coasting). The disconnect clutch is therefore engaged prior to the start of method 700. During prime mover shutdown, the hydraulic system pressure is below the threshold for actuation of the hydraulic piston in the disconnect clutch.

At 702, the method 700 includes starting the prime mover. Once the prime mover is in operation, the fluid pressure in the hydraulic system rises. At 703, the method 700 includes determining if the electro-mechanical valve should be energized. This determination may take into account vehicle speed (e.g., transmission speed), a period of time the vehicle speed has surpassed a threshold speed, a number of output shaft revolutions since starting the prime mover, and/or other combinations of operating conditions. For instance, the electro-mechanical valve may be energized when the vehicle speed surpasses a threshold speed (e.g., 3 kilometers per hour, in one use-case example). In other examples, the electromechanical valve may be energized when the vehicle speed has exceeded a threshold value for a threshold duration of time. Still further, the electro-mechanical valve may be energized when the prime mover's output shaft has exceeded a threshold number of revolutions.

If it is determined that the electro-mechanical valve should not be energized (NO at 703) the method 700 moves to 704 where the method includes sustaining de-energization of the electro-mechanical valve.

Conversely, if it is determined that the electro-mechanical valve should be energized (YES at 703) the method 700 moves to 705 where the method includes energizing the electro-mechanical valve. Energization of the electro-mechanical valve opens the valve and allows fluid flow therethrough.

Next at 706, the method 700 includes flowing pressurized fluid through the electro-mechanical valve to a disconnect clutch to move the clutch piston to initiate disengagement of disconnect clutch. At 708, the method 700 includes deactivating a bi-directional pump responsive to disconnect clutch disengagement. Thus, disengagement of the clutch inhibits torque transfer from the transmission to the bi-directional pump. Method 700 allows the disconnect clutch to be disengaged when the prime mover is running to avoid efficiency losses when use of the bi-directional pump is not desired.

Figure 8:
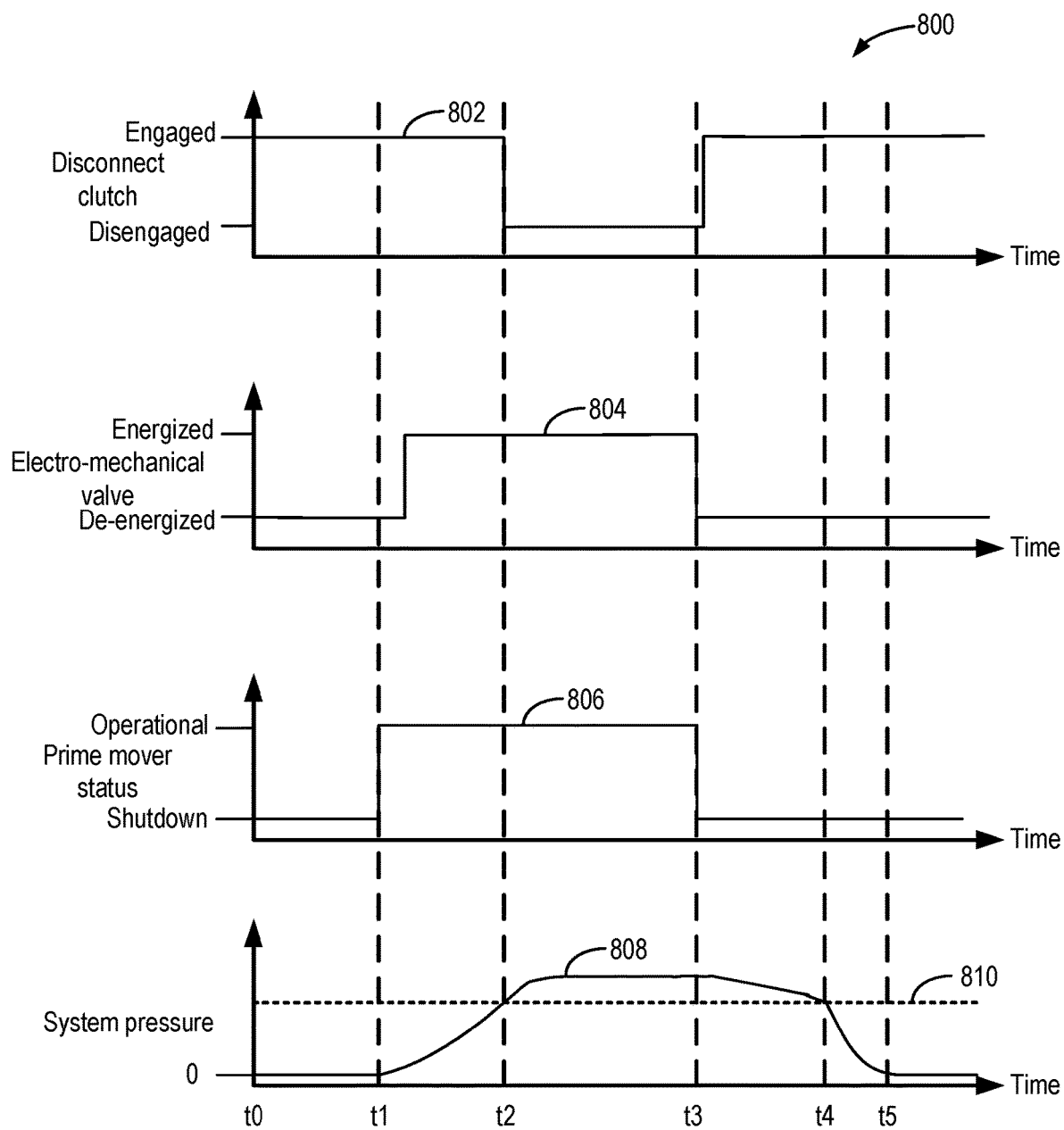
FIG. 8 is a timing diagram for a use-case scenario for a PTO assembly with a disconnect clutch.

FIG. 8 illustrates a timing diagram 800 of a use-case scenario for a PTO assembly and hydraulic system, such as any of the previously described PTO assemblies and hydraulic systems or combinations thereof. In each graph, time is indicated on the abscissa and increases from left to right. The ordinate for plot 802 indicates an operational state of a disconnect clutch ("Engaged" and "Disengaged"). The "Engaged" state of the clutch indicates that the clutch permits rotational energy transfer therethrough and the "Disengaged" state of the clutch denotes that rotational energy transfer through the clutch is inhibited. While the clutch is engaged, the bi-directional pump can be driven by torque from the transmission that may be brought about via towing operation or when the prime mover is not operational but coasting. The ordinate for plot 804 indicates an operational state of the electro-mechanical valve ("Energized" and "De-energized"). The ordinate for plot 806 indicates an operation state of the prime mover ("Operational" and "Shutdown"). The ordinate for plot 808 indicates hydraulic system pressure, where the pressure increases along the ordinate from zero towards the arrow.

At t0, the prime mover is shutdown, the disconnect clutch is engaged, the electro-mechanical valve is de-energized, and system pressure is zero. At t1, the prime mover transitions to an operational state and the electromechanical valve is energized between t1 and t2 when, for example, the prime mover speed has exceeded a threshold value or the prime mover speed has exceeded a threshold value for a threshold duration. Between t1 and t2, system pressure increases. At t2, fluid pressure surpasses the pressure threshold 810 and the disconnect clutch switches from the engaged state to the disengaged state. At t3, the prime mover transitions from an operational state to a shutdown state and the electro-mechanical valve is de-energized. De-energization of the electro-mechanical valve in turn causes the disconnect clutch to disengage between t3 and t4. Alternatively, the disconnect clutch may be disengaged by allowing the system pressure to drop below the threshold pressure 810 at t4, while energization of the electro-mechanical valve is sustained.

The technical effect of the operating methods of the PTO assembly described herein is to effectively provide hydraulic fluid to the hydraulic system when the prime mover is shut down (e.g., during towing operation) to reduce the chance of transmission system component degradation caused by lack of component lubrication as well as provide hydraulic steering and/or clutch actuation functionality, thereby increasing transmission reliability and longevity.

FIGS. 3, 4, 5A, and 5B are drawn approximately to scale, aside from the schematically depicted components, though other relative component dimensions may be used in other embodiments.

FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a power take-off (PTO) assembly is provided that comprises a bi-directional pump in fluidic communication with a fluid reservoir and a hydraulic system; a disconnect clutch configured to: mechanically disengage and disconnect the bi-directional pump from a system when a prime mover is in operation; and mechanically engage and connect the bi-directional pump to the system when the prime mover is shut down; and an electro-mechanical valve configured to trigger engagement and disengagement of the disconnect clutch.

In another aspect, a method for operation of a power take-off (PTO) assembly is provided that comprises during prime mover operation, energizing an electro-mechanical valve to direct fluid from a hydraulic system to a disconnect clutch to sustain disengagement or initiate disengagement of the disconnect clutch and inhibit mechanical power transfer between a transmission and a bi-directional pump that is in fluidic communication with the hydraulic system; and during prime mover shutdown, inhibiting fluid delivery to the disconnect clutch to transition the disconnect clutch into an engaged position that permits mechanical power transfer between the transmission and the bi-directional pump. The method may further include, in one example, de-energizing the electro-mechanical valve to inhibit the fluid delivery from the hydraulic system to the disconnect clutch. The method may further comprise, in one example, passively decreasing a pressure of the fluid delivered to the disconnect clutch below a threshold value to engage the disconnect clutch.

In yet another example, a power take-off (PTO) assembly is provided that comprises a bi-directional pump in fluidic communication with a hydraulic system of a multi-speed transmission; a dog clutch that mechanically connects and disconnects the multi-speed transmission from the bi-directional pump; and a solenoid valve that permits and inhibits fluid flow to an actuation piston in the dog clutch; wherein when the solenoid valve is energized, fluid flow to the actuation piston is permitted and when a pressure of the fluid applied on the actuation piston is above a threshold value, the actuation piston disengages the dog clutch; and wherein when the solenoid valve is de-energized, fluid flow to the actuation piston is inhibited and the actuation piston engages the dog clutch.

In any of the aspects or combinations of the aspects, the electro-mechanical valve may be a solenoid valve that when energized causes mechanically disengagement of the disconnect clutch; and when de-energized causes mechanically engagement of the disconnect clutch.

In any of the aspects or combinations of the aspects, the PTO assembly may further comprise a fluid supply line in fluidic communication with the solenoid valve and the hydraulic system.

In any of the aspects or combinations of the aspects, the disconnect clutch may include a first toothed face that is coupled to a first gear that meshes with a second gear that is coupled to an output shaft that includes an output interface.

In any of the aspects or combinations of the aspects, the disconnect clutch may include a second toothed face that is coupled to a shaft in the bi-directional pump.

In any of the aspects or combinations of the aspects, the bi-directional pump may be in fluidic communication with one or more lubricated components.

In any of the aspects or combinations of the aspects, the prime mover may be an internal combustion engine.

In any of the aspects or combinations of the aspects, the system may be a multi-speed transmission that includes two or more clutches.

In any of the aspects or combinations of the aspects, the bi-directional pump may be in fluidic communication with one or more lubricated components.

In any of the aspects or combinations of the aspects, when the solenoid valve is energized and the pressure of the fluid applied to the actuation piston is less than the threshold value, the actuation piston may engage the dog clutch.

In any of the aspects or combinations of the aspects, the dog clutch may include a spring that is compressed when the dog clutch is disengaged.

In any of the aspects or combinations of the aspects, the bi-directional pump may be in fluidic communication with a sump in the multi-speed transmission.

In any of the aspects or combinations of the aspects, the dog clutch may include a first toothed face that is rotationally coupled to a gear in the multi-speed transmission.

In any of the aspects or combinations of the aspects, the multi-speed transmission may be driven by a traction motor.

In any of the aspects or combinations of the aspects, the disconnect clutch includes a first toothed face that is coupled to a first gear that meshes with a second gear that is coupled to an output shaft that includes an output interface.

In another representation, a ground driven hydraulic power take-off system is provided that comprises a solenoid valve that actively holds a clutch in a disengaged configuration, when energized, wherein the clutch is directly rotationally coupled to a hydraulic pump that feeds a hydraulic fluid to one or more system components, when receiving rotational pump from the clutch, and wherein the clutch is configured to receive rotational input from a shaft and/or a gear in the system.

In any of the aspects or combinations of the aspects, the solenoid valve, when de-energized, may allow the clutch to return to an engaged configuration.

Note that the example control and estimation routines included herein can be used with various system (e.g., powertrain) configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the vehicle, powertrain, and/or transmission control system. The various actions, operations, and/or functions illustrated may be performed in the sequence illustrated, in parallel, or in some cases omitted. Likewise, the order of processing is not necessarily required to achieve the features and advantages of the examples described herein, but is provided for case of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric motors and/or internal combustion engines as well as different systems. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle transmission system, comprising:
a power take-off (PTO) including:
   a bi-directional pump in fluidic communication with a hydraulic system;
   a disconnect clutch configured to:
      selectively mechanically connect and disconnect the bi-directional pump based on an operational state of a prime mover; and
   an valve configured to trigger engagement and disengagement of the disconnect clutch.

2. The vehicle transmission system of claim 1, wherein selectively mechanically connecting and disconnecting the bi-directional pump includes:
mechanically disconnecting the bi-directional pump from the hydraulic system when the prime mover is in operation.

3. The vehicle transmission system of claim 1, wherein selectively mechanically connecting and disconnecting the bi-directional pump includes:
mechanically connecting the bi-directional pump to the hydraulic system when the prime mover is shut down.

4. The vehicle transmission system of claim 1, wherein the hydraulic system is configured to hydraulically actuate multiple clutches.

5. The vehicle transmission system of claim 1, wherein the hydraulic system is configured to supply hydraulic fluid to one or more hydraulic devices.

6. The vehicle transmission system of claim 5, wherein the one or more hydraulic devices include a hydraulic steering component.

7. The vehicle transmission system of claim 1, wherein the prime mover is an internal combustion engine or a traction motor.

8. The vehicle transmission system of claim 1, further comprising a transmission output shaft rotationally coupled to the PTO.

9. The vehicle transmission system of claim 1, wherein the disconnect clutch is a dog clutch.

10. The vehicle transmission system of claim 1, wherein the bi-directional pump includes multiple check valves that are configured to provide fluid to the hydraulic system when the bi-directional pump is rotated in a clockwise direction and a counterclockwise direction.

11. A method for operation of a transmission system, comprising:
selectively mechanically connecting and disconnecting a bi-directional pump based on an operational state of a prime mover via operation of a disconnect clutch;
wherein the transmission system includes:
a power take-off (PTO) including:
the bi-directional pump in fluidic communication with a hydraulic system;
the disconnect clutch; and
an valve configured to trigger engagement and disengagement of the disconnect clutch.

12. The method of claim 11, wherein selectively mechanically connecting and disconnecting the bi-directional pump includes:
mechanically disconnecting the bi-directional pump from the hydraulic system when the prime mover is in operation.

13. The method of claim 11, wherein selectively mechanically connecting and disconnecting the bi-directional pump includes:
mechanically connecting the bi-directional pump to the hydraulic system when the prime mover is shut down.

14. The method of claim 11, wherein the valve is an electro-mechanical valve.

15. The method of claim 11, wherein a working fluid of the bi-directional pump is oil.

16. A system, comprising:
a power take-off including:
a bi-directional pump in fluidic communication with a hydraulic system;
a clutch that mechanically connects and disconnects a multi-speed transmission from the bi-directional pump; and
a solenoid valve that permits and inhibits fluid flow to an actuator of the clutch; and
a controller configured to:
energize the solenoid valve to permit fluid flow to the actuator to disengage the clutch.

17. The system of claim 16, wherein, when the solenoid valve is de-energized during shutdown of a prime mover, fluid flow to the actuator is inhibited and the actuator engages the clutch.

18. The system of claim 17, wherein the prime mover is an internal combustion engine.

19. The system of claim 16, wherein the clutch includes multiple toothed faces.

20. The system of claim 16, wherein the bi-directional pump is in fluidic communication with an oil sump.

* * * * *